US012131682B2

(12) United States Patent
Zhang et al.

(10) Patent No.: US 12,131,682 B2
(45) Date of Patent: Oct. 29, 2024

(54) DISPLAY PANEL DRIVING METHOD, DRIVING APPARATUS, AND DISPLAY APPARATUS

(71) Applicant: HKC CORPORATION LIMITED, Guangdong (CN)

(72) Inventors: Yuanping Zhang, Shenzhen (CN); Haijiang Yuan, Shenzhen (CN)

(73) Assignee: HKC CORPORATION LIMITED, Shenzhen (CN)

( * ) Notice: Subject to any disclaimer, the term of this patent is extended or adjusted under 35 U.S.C. 154(b) by 0 days.

(21) Appl. No.: 17/796,322

(22) PCT Filed: Dec. 23, 2021

(86) PCT No.: PCT/CN2021/140974
§ 371 (c)(1),
(2) Date: Jul. 29, 2022

(87) PCT Pub. No.: WO2022/199169
PCT Pub. Date: Sep. 29, 2022

(65) Prior Publication Data

US 2024/0185758 A1 Jun. 6, 2024

(30) Foreign Application Priority Data

Mar. 23, 2021 (CN) ......................... 202110308042.1

(51) Int. Cl.
*G09G 3/20* (2006.01)

(52) U.S. Cl.
CPC ....... *G09G 3/2074* (2013.01); *G09G 2320/02* (2013.01); *G09G 2320/0285* (2013.01); *G09G 2360/18* (2013.01)

(58) Field of Classification Search
CPC ............. G09G 3/2074; G09G 2320/02; G09G 2320/0285; G09G 2360/18
See application file for complete search history.

(56) References Cited

U.S. PATENT DOCUMENTS

2003/0151579 A1 8/2003 Lee
2012/0218322 A1 8/2012 Shiomi
(Continued)

FOREIGN PATENT DOCUMENTS

CN 103151015 A 6/2013
CN 103390394 A 11/2013
(Continued)

OTHER PUBLICATIONS

International Search Report issued on Mar. 2, 2022, in connection with corresponding International Patent Application No. PCT/CN2021/140974; 4 pages.

*Primary Examiner* — Towfiq Elahi
(74) *Attorney, Agent, or Firm* — Maier & Maier, PLLC

(57) ABSTRACT

A display panel driving method, a driving apparatus, and a display apparatus are provided. The method includes: determining an over driving voltage according to a first display gray scale and second display gray scale, the first display gray scale a display gray scale of a target pixel cell in a current frame, the second display gray scale a display gray scale of the target pixel cell in a previous frame; determining a pre-charging gray scale according to the second display gray scale and a third display gray scale, the third display gray scale a display gray scale of a row above the target pixel cell in the current frame; determining a target gray scale according to the over driving gray scale and pre-charging gray scale; determining a target driving voltage according to the target gray scale, and driving the target pixel cell based on the target driving voltage.

11 Claims, 2 Drawing Sheets

(56) References Cited

U.S. PATENT DOCUMENTS

| | | | | |
|---|---|---|---|---|
| 2013/0033481 | A1 | 2/2013 | Kang | |
| 2014/0354625 | A1 | 12/2014 | Shin | |
| 2016/0118001 | A1* | 4/2016 | Ahn | G09G 3/3648 345/88 |
| 2016/0125786 | A1* | 5/2016 | Lai | G09G 3/36 345/691 |
| 2017/0352317 | A1* | 12/2017 | Huang | G02F 1/134309 |
| 2018/0090049 | A1 | 3/2018 | Kim et al. | |
| 2021/0097947 | A1* | 4/2021 | Liu | G09G 3/3696 |

FOREIGN PATENT DOCUMENTS

| | | | | |
|---|---|---|---|---|
| CN | 104183209 | A | 12/2014 | |
| CN | 105895040 | A | 8/2016 | |
| CN | 106531114 | A | 3/2017 | |
| CN | 108847194 | A | 11/2018 | |
| CN | 109192176 | A | 1/2019 | |
| CN | 109493803 | A | 3/2019 | |
| CN | 111028761 | A | 4/2020 | |
| CN | 111862889 | A | 10/2020 | |
| CN | 112133257 | * | 12/2020 | G09G 3/36 |
| CN | 112216237 | A | 1/2021 | |
| CN | 112397036 | A | 2/2021 | |
| CN | 113035149 | A | 6/2021 | |
| TW | 200802248 | A | 1/2008 | |

* cited by examiner

DISPLAY PANEL DRIVING METHOD, DRIVING APPARATUS, AND DISPLAY APPARATUS

CROSS-REFERENCE TO RELATED APPLICATIONS

The present application is a national phase of International Application No. PCT/CN2021/140974 filed on Dec. 23, 2021, which claims priority of Chinese Patent Application No. 202110308042.1 filed with the State Intellectual Property Office on Mar. 23, 2021 and entitled "DISPLAY PANEL DRIVING METHOD, DRIVING APPARATUS, AND DISPLAY APPARATUS", the entire contents of which are incorporated herein by reference.

TECHNICAL FIELD

Embodiments of the present application involves in the field of display technologies, and particularly relates to a display panel driving method, a driving apparatus and a display apparatus.

BACKGROUND

Since LCDs (Liquid Crystal Displays) have advantages of thin volume, light weight and low electromagnetic radiation, they have been widely used in recent years.

over driving is a means of quickly flipping a liquid crystal pixel to a target position through adjusting a driving voltage of the liquid crystal pixel. It charges the liquid crystal pixel by using an overdrive voltage that is larger than a target voltage, and then reduces the overdrive voltage to the target voltage (the pixel voltage corresponding to a gray scale displayed by the liquid crystal pixel) when the liquid crystal pixel is deflected to a predetermined position, the charging time can be effectively reduced, so that the liquid crystal pixel can be quickly flipped to the target position.

At present, the over driving operation usually compares a gray scale of a current frame with a gray scale of a previous frame, and a certain amount of gray scale is added to the gray scale of the current frame to charge the corresponding pixel if the gray scale of the current frame is higher than the gray scale of the previous frame. Conversely, if the gray scale of the current frame is lower than the gray scale of the previous frame, a certain amount of gray scale is subtracted from the gray scale of the current frame. How many gray scales to be added or subtracted may be determined from an overdrive look-up table.

In order to reduce charging time, the current LCDs are provided with a pre-charging function, the pre-charging function is to open a data line of a next row to pre-charge pixel cells at the next row while charging pixel cells at a current row. Here, when the pre-charging causes the voltage of the pixel cells at the next row to be reduced and the gray scale of the current frame of the pixel cells is lower than the gray scale of the previous frame, the charging voltage of the pixel cells will not be enough to meet the requirement that the gray scale of the pixel cells is displayed at a target gray scale; and when the pre-charging causes the voltage of the pixel cells at the next row to be increased and the gray scale of the current frame of the pixel cells is higher than the gray scale of the previous frame, the charging voltage of the pixel cells will be greater than the voltage that makes the gray scale of the pixel cells display at the target gray scale, so that the gray scale display of the pixel cells is higher than the target gray scale.

It can be seen from the above that the current over driving method will lead to inaccurate gray scale display, thereby resulting in distortion of display images and seriously affecting display effect of a display device.

SUMMARY

Embodiments of the present application provide a display panel driving method, a driving apparatus and a display apparatus, which are aimed to solve the situation that the current over driving method will lead to inaccurate gray scale display, thereby resulting in distortion of display images and seriously affecting display effect of a display device.

A first aspect of embodiments of the present application provides a display panel driving method, the display panel includes a pixel array including a plurality of rows of sub-pixel cells and a plurality of columns of pixel cells, and the driving method includes:

- determining an over driving voltage according to a first display gray scale and a second display gray scale: where the first display gray scale is a display gray scale of a target pixel cell in a current frame, and the second display gray scale is a display gray scale of the target pixel cell in a previous frame:
- determining a pre-charging gray scale according to the second display gray scale and a third display gray scale: where the third display gray scale is a display gray scale of a row above the target pixel cell in the current frame:
- determining a target gray scale according to the over driving gray scale and the pre-charging gray scale;
- determining a target driving voltage according to the target gray scale, and driving the target pixel cell in the pixel array based on the target driving voltage.

In an embodiment, the determining an over driving voltage according to a first display gray scale and a second display gray scale includes:

- determining the first display gray scale according to an image to be displayed;
- acquiring the second display gray scale from a frame buffer;
- looking up the over driving gray scale corresponding to the first display gray scale and the second display gray scale through a first look-up table.

In an embodiment, the determining a pre-charging gray scale according to the second display gray scale and a third display gray scale includes:

- acquiring the second display gray scale from a frame buffer;
- acquiring the third display gray scale from a row buffer;
- looking up the pre-charging gray scale corresponding to the second display gray scale and the third display gray scale through a second look-up table.

In an embodiment, the driving method further includes storing display data of the previous frame by a frame buffer.

In an embodiment, the driving method further includes storing display data of the row above the target pixel cell in the current frame by a row buffer.

A second aspect of embodiments of the present application provides a display panel driving apparatus, the display panel includes a pixel array including a plurality of rows of sub-pixel cells and a plurality of columns of pixel cells, and the driving apparatus includes:

- a memory controller configured to: determine a target gray scale according to a first display gray scale, a second display gray scale and a third display gray scale, and determine a target driving voltage according to the target gray scale; where, the first display gray scale is a display gray scale of a target pixel cell in a current frame, the second display gray scale is a display gray scale of the target pixel cell in a previous frame, and the third display gray scale is a display gray scale of a row above the target pixel cell in the current frame;
- a frame buffer connected to the memory controller and configured to store display data of the previous frame;
- a row buffer connected to the memory controller and configured to store display data of the row above the target pixel cell in the current frame;
- a driving module configured to drive the target pixel cell in the pixel array based on the target voltage.

In an embodiment, the memory controller includes:

- a first determination unit configured to determine an over driving gray scale according to the first display gray scale and the second display gray scale;
- a second determination unit configured to determine a pre-charging gray scale according to the second display gray scale and the third display gray scale;
- a third determination unit configured to determine a target gray scale according to the over driving gray scale and the pre-charging gray scale.

In an embodiment, the first determination unit includes:

- a first gray scale determination unit configured to determine the first display gray scale according to an image to be displayed;
- a second gray scale determination unit configured to acquire the second display gray scale from a frame buffer;
- a first look-up unit configured to look up the over driving gray scale corresponding to the first display gray scale and the second display gray scale through a first look-up table.

In an embodiment, the second determination unit includes:

- a third gray scale determination unit configured to acquire the third display gray scale from a row buffer;
- a second look-up unit configured to look up the pre-charging gray scale corresponding to the second display gray scale and the third display gray scale through a second look-up table.

A third aspect of embodiments of the present application provides a display apparatus, which includes:

- a display panel: and
- the display panel driving apparatus as described in the second aspect.

In the embodiments of the present application, the influence of the pre-charging on the over driving process of the pixel cell is determined and eliminated through introducing the display data of the row above the target pixel cell in the current frame, so that the driving method provided by the embodiments of the present application can accurately display the display gray scale of each of the pixel cells, thereby ensuring the display effect of the display device.

BRIEF DESCRIPTION OF THE DRAWINGS

In order to illustrate the technical solutions in the embodiments of the present application more clearly, the drawings needed to be used in the description of the embodiments will be briefly introduced below, and it is obvious that the drawings in the following description are some embodiments of the present application and other drawings may further be obtained based on these drawings for those of ordinary skill in the art without any creative effort.

DETAILED DESCRIPTION OF THE EMBODIMENTS

Figure 1:
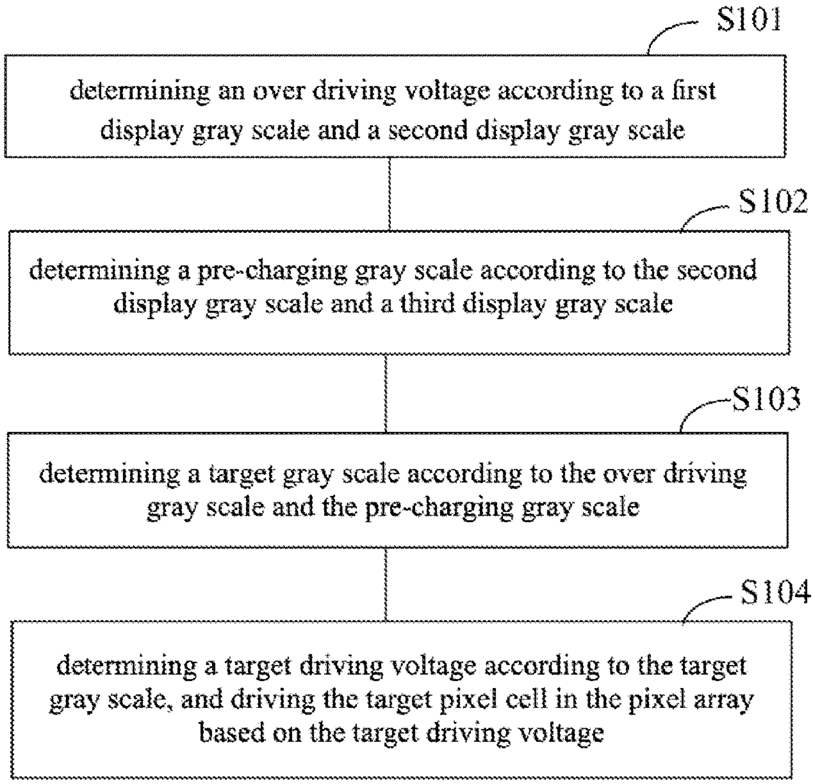
FIG. 1 is a schematic diagram of an implementation flowchart of a display panel driving method provided by an embodiment of the present application.

In order to make those skilled in the art better understand the solutions of the present application, the technical solutions in the embodiments of the present application will be clearly described below with reference to the accompanying drawings in the embodiments of the present application, and it is obvious that the described embodiments are of some, but not all, embodiments of the present application. Based on the embodiments in the present application, all other embodiments obtained by those of ordinary skill in the art without creative work shall fall within the scope of protection of the present application.

The terms "comprising" and any variations thereof in the specification, claims and the above-mentioned drawings of the present application are intended to cover non-exclusive inclusion. For example, a process, method or system, product or device comprising a series of steps or units is not limited to listed steps or units, but optionally further includes an unlisted step or unit, or optionally further includes other steps or units inherently included in the process, method, product or device. Moreover, the terms "first," "second," and "third," etc. are used to distinguish different objects, rather than to describe a particular order.

In the field of TFT-LCDs, each of the pixel cells in the display panel includes two electrodes, one is a common electrode and the other is a pixel electrode. The common electrodes of all pixel cells in the display panel are connected together and a common electrode voltage is accessed in, and the pixel electrodes are respectively connected to corresponding data lines and corresponding data voltages are accessed in. Different pixel voltages will display different gray scales. The pixel voltages of the display panel are determined by voltage differences between the data voltages and the voltage of the common electrodes, the voltage differences are directly related to a transmittance property of liquid crystal molecules in the liquid crystal of the pixel cells, and the transmittance of the liquid crystal is greater when a deflection angle of the liquid crystal molecules in the liquid crystal is greater due to larger voltage difference. In order to make the liquid crystal in the display panel quickly flip to the target position to display the corresponding gray scales, the charging time may be reduced through adjusting driving voltages of the pixel cells.

In a specific application, the voltage value that needs to be increased during the over driving operation may be determined through a look-up table. Through continuously adjust the over driving voltage between every two phases, a target over driving voltage that enables a response curve corresponding to the two phases (a time-phase relationship curve of the pixel cell) to serve as an optimal response curve may be obtained in the above look-up table, and then a look-up table for the above-mentioned over driving operation is determined.

Specifically, an initial gray scale value and a target gray scale value may be determined firstly, and then a gray scale value corresponding to the over driving voltage may be set, and next whether a measured response curve of the set driving voltage is the best response curve is determined, if it is not, the gray scale value corresponding to the set over driving voltage is adjusted again until the best gray scale value corresponding to the over driving voltage is found (the response curve is the best response curve), and then the gray scale value corresponding to this over driving voltage is filled in the look-up table to thereby obtain the look-up table corresponding to the over driving as shown in Table I. It should be noted that the created look-up table may be stored in a table memory of the display panel in advance, when the over driving operation is required, the memory controller can find the gray scale value corresponding to the corresponding over driving voltage through reading the look-up table stored in the table memory after the initial gray scale value (the corresponding display gray scale of the target pixel cell in the previous frame) and the target gray scale value (the corresponding display gray scale of the target pixel cell in the current frame) are determined.

Exemplarily, Table I shows part of contents of the look-up table corresponding to the over driving operation. Please refer to the Table I, assuming that the corresponding display gray scale of the target pixel cell (Pixel) in the previous frame is 0, and the display gray scale of the current frame needs to be increased to 128, then it may be found that the gray scale that is required to be additionally added is 20 according to the Table I, therefore, the driving voltage of the target pixel cell may be set as a charging voltage corresponding to the gray scale 148. Assuming that the display gray scale corresponding to the target pixel cell in the previous frame is 256, and the display gray scale of the current frame needs to be reduced to 128, then it may be found that the gray scale that is required to be additionally reduced is −35 according to the Table I, therefore, the driving voltage of the target pixel cell may be set as a charging voltage corresponding to the gray scale 93 (128-35).

TABLE I

| | | | | | | | | |
|---|---|---|---|---|---|---|---|---|
| the | 256 | 0 | 0 | 0 | 0 | 0 | 0 | 0 |
| display | 192 | 15 | 15 | 12 | 9 | 7 | 0 | −16 |
| gray | 176 | 16 | 18 | 14 | 9 | 6 | −6 | −19 |
| scale | 144 | 18 | 21 | 16 | 5 | −8 | −7 | −26 |
| in the | 128 | 20 | 20 | 14 | 0 | −8 | −9 | −35 |
| current | 64 | 12 | 14 | 0 | −17 | −19 | −21 | −35 |
| frame | 16 | 2 | 0 | −9 | −16 | −16 | −16 | −16 |
| | 0 | 0 | 0 | 0 | 0 | 0 | 0 | 0 |
| | | 0 | 16 | 64 | 128 | 160 | 192 | 256 |
| | | the display gray scale of the target pixel cell in the previous frame | | | | | | |

It should be noted that a positive number in the Table I means increasing the gray scale, and a negative number means reducing the gray scale.

However, the influence of the pre-charge operation on the charging voltage is not taken into account in the current over driving operation, when the pre-charging causes the voltage of the pixel cells at the next row to be reduced and the gray scale of the current frame of the pixel cells is lower than the gray scale of the previous frame, the charging voltage of the pixel cells will not be enough to meet the requirement that the gray scale of the pixel cells is displayed at the target gray scale: and when the pre-charging causes the voltage of the pixel cells at the next row to be increased and the gray scale of the current frame of the pixel cells is higher than the gray scale of the previous frame, the charging voltage of the pixel cells will be greater than the voltage that makes the gray scale of the pixel cells display at the target gray scale, so that the gray scale display of the pixel cells is higher than the target gray scale, thereby leading to inaccurate gray scale display, resulting in distortion of display images and seriously affecting display effect of a display device.

In order to solve the above problem, an embodiment of the present application provides a display panel driving method. FIG. 1 shows a schematic diagram of an implementation flow of the display panel driving method provided by the present application. As shown in FIG. 1, the display panel driving method includes following steps.

At S101: determine an over driving voltage according to a first display gray scale and a second display gray scale.

In an embodiment of the present application, the first display gray scale is a display gray scale of a target pixel cell in a current frame, and the second display gray scale is a display gray scale of the target pixel cell in a previous frame.

In an embodiment of the present application, the display gray scale of the target pixel cell in the current frame may be determined through receiving display data of an image to be displayed, and then the display gray scale corresponding to this target pixel cell in the previous frame may be determined through display data of the previous frame stored in a frame buffer, thereby the corresponding display gray scale (over driving gray scale) during over driving is determined.

Here, through traversing the display data of the image to be displayed (the current frame), the display gray scale of each of pixel cells in the current frame can be determined. Specifically, the display panel includes a plurality of pixel cells, and the display data of the image to be displayed includes display data of each of the pixel cells, and specifically includes the display gray scale of each of the pixel cells in the image to be displayed (that is, the display gray scale of each of the pixel cells in the current frame). Therefore, the display gray scale of the target pixel cell in the current frame may be determined.

In a specific application, the frame buffer will clear previously saved data after the image to be displayed is displayed and output, and then save the display data of the last frame just output. Here, the display data of the previous frame includes the display data of each of the pixel cells (which is specifically the display gray scale), so the display data of each of the pixel cells in the previous frame may be determined through reading the display data of the previous frame saved in the frame buffer.

In a specific application, after the display gray scale of the target pixel cell in the current frame and the display gray scale of the target pixel cell in the previous frame are determined, the over driving gray scale may be correspondingly queried through a first look-up table.

Exemplarily, Table II shows relevant data of the first look-up table. As shown in the Table II, assuming that the display gray scale of the target pixel cell in the previous frame is 16 and the display gray scale in the current frame is 48, then the over driving gray scale may be found to be 6 according to the first look-up table.

TABLE II

| | | | | . . . | | | | |
|---|---|---|---|---|---|---|---|---|
| the | 64 | 8 | 7 | 6 | 3 | 2 | 2 | . |
| display | 48 | 7 | 6 | 5 | 2 | 1 | 0 | . |
| gray | 32 | 6 | 5 | 3 | 1 | 0 | −1 | . |
| scale | 24 | 5 | 4 | 2 | 0 | −1 | −2 | |
| in the | 16 | 4 | 2 | 0 | −1 | −3 | −4 | |
| current | 8 | 3 | 0 | −1 | −3 | −4 | −5 | |
| frame | 0 | 0 | 0 | 0 | 0 | 0 | 0 | |
| | | 0 | 16 | 32 | 48 | 64 | 80 | |
| | | the display gray scale of the target pixel cell in the previous frame | | | | | | |

It should be noted that, the first look-up table may also be created according to the existing way of creating the above-mentioned look-up table corresponding to the over driving operation, details of which will not described herein again. The data in the Table II is only an example and not a limitation, which is not limited in the present application. In the Table II, a positive number means increasing the gray scale, and a negative number means reducing the gray scale.

It should also be noted that the first look-up table may be stored in a look-up table memory, specifically, the first look-up table may be pre-stored in the look-up table memory.

At S102, determine a pre-charging gray scale according to the second display gray scale and a third display gray scale.

In an embodiment of the present application, the second display gray scale is the display gray scale of the target pixel cell in the previous frame, and the third display gray scale is a display gray scale of a row above the target pixel cell in the current frame.

In an embodiment of the present application, the display gray scale corresponding to the target pixel cell in the previous frame may be determined through the display data of the previous frame stored in the frame buffer, and the display gray scale of the row above the pixel cell in the current frame is determined according to display data of the upper row stored in a row buffer, and then the corresponding display gray scale during pre-charging (i.e., the pre-charging gray scale) is further determined.

In a specific application, after the display gray scale of the target pixel cell in the previous frame and the display gray scale of the row above the target pixel cell in the current frame are determined, the pre-charging gray scale may be correspondingly queried through a second look-up table.

Exemplarily, Table III shows relevant data of the second look-up table. As shown in the Table III, assuming that the display gray scale of the target pixel cell in the previous frame is 16, and the display gray scale of the upper row in the current frame is 24, then the pre-charging gray scale may be found to be 2 according to the second look-up table.

TABLE III

| | | | | . . . | | | | |
|---|---|---|---|---|---|---|---|---|
| the | 64 | 8 | 7 | 6 | 3 | 2 | 2 | . |
| display | 48 | 7 | 6 | 5 | 2 | 1 | 0 | . |
| gray scale | 32 | 6 | 5 | 3 | 1 | 0 | −1 | . |
| of the upper | 24 | 5 | 4 | 2 | 0 | −1 | −2 | |
| row in the | 16 | 4 | 2 | 0 | −1 | −3 | −4 | |
| current | 8 | 3 | 0 | −1 | −3 | −4 | −5 | |
| frame | 0 | 0 | 0 | 0 | 0 | 0 | 0 | |
| | | 0 | 8 | 16 | 24 | 32 | 48 | |
| | | the display gray scale of the target pixel cell in the previous frame | | | | | | |

It should be noted that, the second look-up table may also be created according to the existing way of creating the above-mentioned look-up table corresponding to the over driving operation, details of which will not described herein again. The data in the Table III is only an example and not a limitation, which is not limited in the present application. In the Table III, a positive number means increasing the gray scale, and a negative number means reducing the gray scale.

It should also be noted that the second look-up table may be stored in the look-up table memory, specifically, the second look-up table may be pre-stored in the look-up table memory.

At S103: determine a target gray scale according to the over driving gray scale and the pre-charging gray scale.

In an embodiment of the present application, the target gray scale may be determined by subtracting the data corresponding to the second look-up table from the data corresponding to the first look-up table. Specifically, the target gray scale is determined through subtracting the pre-charging gray scale from the over driving gray scale, so that the influence of the pre-charging can be offset during the over driving.

Exemplarily, according to the data in the Table II and Table III, assuming that the first display gray scale is 48, the second display gray scale is 16, and the third display gray scale is 24, then the over driving gray scale is 6, and the pre-charging gray scale is 2, thereby the target gray scale may be obtained as 6−2=4.

At S104: determine a target driving voltage according to the target gray scale, and drive the target pixel cell in the pixel array based on the target driving voltage.

In an embodiment of the present application, after the target gray scale is determined, if the target gray scale is a positive number, it means that the display gray scale of the target pixel cell needs to be increased at this time, so the target gray scale may be increased on the basis of the first display gray scale to obtain the display gray scale during actual charging, and thereby the target driving voltage during the actual charging is determined. For example, the first display gray scale is 48, and the target gray scale is 4, then the target driving voltage is determined as the corresponding driving voltage when the display gray scale is 52.

If the target gray scale is a negative number, it means that the display gray scale of the target pixel cell needs to be reduced at this time, so the gray scale value corresponding to the target gray scale may be subtracted on the basis of the first display gray scale to obtain the display gray scale during actual charging, and thereby the target driving voltage during the actual charging is determined.

It can be seen from the above that in the embodiment of the present application, the influence of the pre-charging on the over driving process of the pixel cell is determined and eliminated through introducing the display data of the upper row in the current frame, so that the driving method provided by the embodiment of the present application can accurately display the display gray scale of each of the pixel cells, thereby ensuring the display effect of the display device.

In an embodiment of the present application, the above driving method may further include the following steps:

storing display data of the previous frame through a frame buffer;

storing display data of the row above the target pixel cell through a row buffer.

In a specific application, through storing the display data of the previous frame in the frame buffer, the display gray scale of the target pixel cell in the previous frame can be determined. When the display gray scale of the target pixel cell in the previous frame needs to be acquired, it may be determined through querying the stored display data.

The display data of the row above the target pixel cell is stored in the row buffer, and the display gray scale of the row above the target pixel cell in the current frame may be determined through querying the stored display data when it needs to be acquired.

In an embodiment of the present application, the foregoing S101 includes following steps of:

determining the first display gray scale according to an image to be displayed;

acquiring the second display gray scale from the frame buffer;

searching out the over driving gray scale corresponding to the first display gray scale and the second display gray scale through a first look-up table.

In a specific application, since the frame buffer stores the display data of the previous frame, thus the second display gray scale may be determined. Then, the first display gray scale may be obtained according to the input display data (image to be displayed) of the current row in the current frame. Next, based on the above-mentioned first look-up table, the corresponding over driving gray scale may be searched out, and regarding the specific search process, reference may be made to the description of the S101, which will not be repeated herein again.

In an embodiment of the present application, the foregoing S102 may include following steps of:

acquiring the second display gray scale from the frame buffer;

acquiring the third display gray scale from the row buffer;

searching out the pre-charging gray scale corresponding to the second display gray scale and the third display gray scale through a second look-up table.

In a specific application, since the frame buffer stores the display data of the previous frame, thus the second display gray scale may be determined. The row buffer stores the display data of the row above the target pixel cell in the current frame, so the third display gray scale may be determined. Based on the above-mentioned second look-up table, the corresponding over driving gray scale may be searched, and regarding the specific search process, reference may be made to the description of the S102, which will not be repeated herein again.

Figure 2:
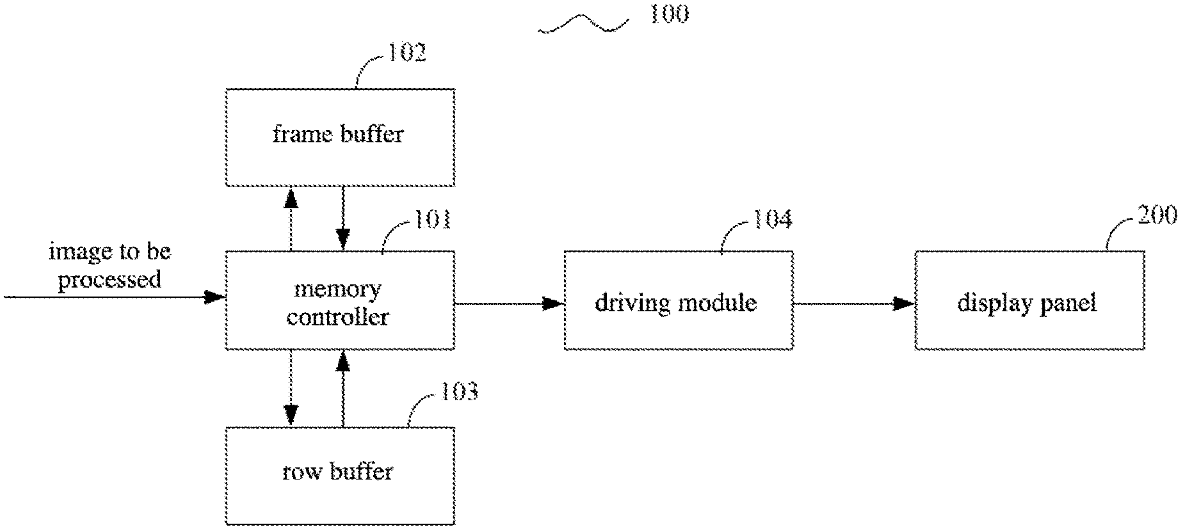
FIG. 2 is a schematic structural diagram of a display panel driving apparatus provided by an embodiment of the present application.

Referring to FIG. 2, an embodiment of the present application further provides a display panel driving apparatus 100. As shown in FIG. 2, the display panel driving apparatus 100 is electrically connected to a display panel 200. The driving apparatus 100 is configured to drive the display panel 200, and the display panel 200 includes a pixel array including a plurality of rows of sub-pixel cells and a plurality of columns of pixel cells.

The driving apparatus 100 includes a memory controller 101, a frame buffer 102, a row buffer 103 and a driving module 104.

The memory controller 101 is configured to determine a target gray scale according to a first display gray scale, a second display gray scale and a third display gray scale.

The memory controller 101 is further configured to determine a target driving voltage according to the target gray scale.

Among them, the first display gray scale is a display gray scale of a target pixel cell in a current frame, the second display gray scale is a display gray scale of the target pixel cell in a previous frame: the third display gray scale is a display gray scale of a row above the target pixel cell in the current frame;

the frame buffer 102 is connected to the memory controller, and is configured to store display data of the previous frame;

the row buffer 103 is connected to the memory controller, and is configured to store display data of the row above the target pixel cell in the current frame;

the driving module 104 is configured to drive the target pixel cell in the pixel array based on the target voltage.

In a specific application, when the display data of the current row in the current frame is input, the memory controller 101 will determine the first display gray scale according to the input display data, and the memory controller 101 will further read the display data stored in the frame buffer 102 to obtain the second display gray scale, and the memory controller 101 will further read the display data stored in the row buffer 103 to obtain the third display gray scale. After the memory controller 101 determines the first display gray scale, the second display gray scale and the third display gray scale, the target gray scale may be determined according to the first display gray scale, the second display gray scale and the third display gray scale. The memory controller 101 may further determine the target driving voltage according to the target gray scale, and then the driving module 104 drives the target pixel cell in the pixel array based on the target voltage.

In an embodiment of the present application, the memory controller 101 includes:

a first determination unit, configured to determine an over driving gray scale according to the first display gray scale and the second display gray scale;

a second determination unit, configured to determine a pre-charging gray scale according to the second display gray scale and the third display gray scale;

a third determination unit, configured to determine a target gray scale according to the over driving gray scale and the pre-charging gray scale.

In an embodiment of the present application, the first determination unit includes:

a first gray scale determination unit, configured to determine the first display gray scale according to an image to be displayed;

a second gray scale determination unit, configured to acquire the second display gray scale from the frame buffer;

a first look-up unit, configured to look up the over driving gray scale corresponding to the first display gray scale and the second display gray scale through a first look-up table.

In an embodiment of the present application, the second determination unit includes:

a third gray scale determination unit, configured to acquire the third display gray scale from the row buffer;

a second look-up unit, configured to look up the pre-charging gray scale corresponding to the second display gray scale and the third display gray scale through a second look-up table.

It should be noted that the first look-up table and the second look-up table may be pre-stored in a look-up table memory, the look-up table memory may also be connected to the memory controller 101, and the memory controller 101 can read the first look-up table and the second look-up table in the look-up table memory, thereby determining the over driving gray scale and the pre-charging gray scale.

It can be seen from this that the display panel driving apparatus provided by the embodiments of the present application also determines and eliminates the influence of pre-charging on the over driving process of the pixel cell through introducing the display data of the row above the target pixel cell in the current frame, so that the driving method provided by the embodiments of the present application can accurately display the display gray scale of each of the pixel cells, thereby ensuring the display effect of the display device.

Figure 3:
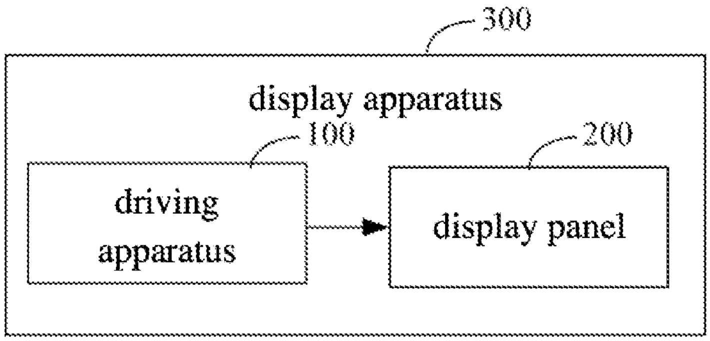
FIG. 3 is a schematic structural diagram of a display apparatus provided by an embodiment of the present application.

Referring to FIG. 3, an embodiment of the present application further provides a display apparatus 300, which includes a display panel 200 and the display panel driving apparatus 100 as described above.

In an application, the display apparatus may be any type of display apparatus, such as an LCD apparatus based on LCD (Liquid Crystal Display) technologies, an OLED apparatus based on OLED (Organic Electroluminesence Display) technologies, an QLED display apparatus or a curved display apparatus based on QLED (Quantum Dot Light Emitting Diode) technologies or the like.

In an embodiment of the present application, the modules or units in all the embodiments of the present application may be implemented through a general-purpose integrated circuit, such as a CPU (Central Processing Unit) or an ASIC (Application Specific Integrated Circuit).

Those of ordinary skill in the art can understand that all or part of the processes in the methods of the above embodiments may be implemented by instructing relevant hardware by a computer program, and the program may be stored in a computer-readable storage medium, and the program may include the processes of the embodiments of the above-mentioned methods when executed. Here, the storage medium may be a magnetic disk, an optical disk, a ROM (Read-Only Memory), or a RAM (Random Access Memory) or the like.

The above descriptions are only preferred embodiments of the present application, and are not intended to limit the present application. Any modification, equivalent replacement and improvement etc. made within the spirit and principles of the present application shall be included within the protection scope of the present application.

What is claimed is:

1. A display panel driving method, wherein the display panel comprises a pixel array comprising a plurality of rows of sub-pixel cells and a plurality of columns of pixel cells, and the driving method comprises:

determining an over driving voltage according to a first display gray scale and a second display gray scale; wherein the first display gray scale is a display gray scale of a target pixel cell in a current frame, and the second display gray scale is a display gray scale of the target pixel cell in a previous frame;

determining a pre-charging gray scale according to the second display gray scale and a third display gray scale; wherein the third display gray scale is a display gray scale of a row above the target pixel cell in the current frame;

determining a target gray scale according to the over driving gray scale and the pre-charging gray scale; and determining a target driving voltage according to the target gray scale, and driving the target pixel cell in the pixel array based on the target driving voltage.

2. The display panel driving method of claim 1, wherein, the determining of an over driving voltage according to a first display gray scale and a second display gray scale comprises:

determining the first display gray scale according to an image to be displayed;

acquiring the second display gray scale from a frame buffer;

looking up the over driving gray scale corresponding to the first display gray scale and the second display gray scale through a first look-up table.

3. The display panel driving method of claim 1, wherein, the determining of a pre-charging gray scale according to the second display gray scale and a third display gray scale comprises:

acquiring the second display gray scale from a frame buffer;

acquiring the third display gray scale from a row buffer;

looking up the pre-charging gray scale corresponding to the second display gray scale and the third display gray scale through a second look-up table.

4. The display panel driving method of claim 1, further comprising:

storing display data of the previous frame by a frame buffer.

5. The display panel driving method of claim 2, further comprising:

storing display data of the previous frame by the frame buffer.

6. The display panel driving method of claim 3, further comprising:

storing display data of the previous frame by the frame buffer.

7. The display panel driving method of claim 1, further comprising:

storing display data of the row above the target pixel cell in the current frame by a row buffer.

8. The display panel driving method of claim 2, further comprising:

storing display data of the row above the target pixel cell in the current frame by a row buffer.

9. The display panel driving method of claim 3, further comprising:

storing display data of the row above the target pixel cell in the current frame by the row buffer.

10. A display panel driving apparatus, wherein the display panel comprises a pixel array comprising a plurality of rows of sub-pixels and a plurality of columns of pixel cells, and the driving apparatus comprises:

a memory controller configured to: determine a target gray scale according to a first display gray scale, a second display gray scale and a third display gray scale, and determine a target driving voltage according to the target gray scale; wherein, the first display gray scale is a display gray scale of a target pixel cell in a current frame, the second display gray scale is a display gray scale of the target pixel cell in a previous frame, and the third display gray scale is a display gray scale of a row above the target pixel cell in the current frame;

a frame buffer connected to the memory controller and configured to store display data of the previous frame;

a row buffer connected to the memory controller and configured to store display data of the row above the target pixel cell in the current frame; and a driving module configured to drive the target pixel cell in the pixel array based on the target voltage.

11. A display apparatus comprising:

a display panel; and a display panel driving apparatus, wherein the display panel comprises a pixel array comprising a plurality of rows of sub-pixels and a plurality of columns of pixel cells, and the driving apparatus comprises:

a memory controller configured to: determine a target gray scale according to a first display gray scale, a second display gray scale and a third display gray scale, and determine a target driving voltage according to the target gray scale; wherein, the first display gray scale is a display gray scale of a target pixel cell in a current frame, the second display gray scale is a display gray scale of the target pixel cell in a previous frame, and the third display gray scale is a display gray scale of a row above the target pixel cell in the current frame;

a frame buffer connected to the memory controller and configured to store display data of the previous frame;

a row buffer connected to the memory controller and configured to store display data of the row above the target pixel cell in the current frame; and a driving module configured to drive the target pixel cell in the pixel array based on the target voltage.

* * * * *